(12) United States Patent
Wharry et al.

(10) Patent No.: US 12,246,323 B2
(45) Date of Patent: Mar. 11, 2025

(54) ASSAY CARTRIDGE AND SUPPORT HOUSING

(71) Applicant: RANDOX LABORATORIES LTD, Crumlin (GB)

(72) Inventors: Marc Wharry, Crumlin (GB); Martin Reid, Crumlin (GB); Peter Fitzgerald, Crumlin (GB)

(73) Assignee: RANDOX LABORATORIES LTD, Crumlin (GB)

( * ) Notice: Subject to any disclaimer, the term of this patent is extended or adjusted under 35 U.S.C. 154(b) by 720 days.

(21) Appl. No.: 17/602,826

(22) PCT Filed: Apr. 9, 2020

(86) PCT No.: PCT/GB2020/050938
§ 371 (c)(1),
(2) Date: Oct. 11, 2021

(87) PCT Pub. No.: WO2020/208370
PCT Pub. Date: Oct. 15, 2020

(65) Prior Publication Data
US 2022/0143618 A1 May 12, 2022

(30) Foreign Application Priority Data
Apr. 12, 2019 (GB) .................................... 1905229

(51) Int. Cl.
*B01L 3/00* (2006.01)
*B01L 9/00* (2006.01)
(52) U.S. Cl.
CPC ............ *B01L 3/527* (2013.01); *B01L 3/5085* (2013.01); *B01L 9/523* (2013.01);
(Continued)

(58) Field of Classification Search
None
See application file for complete search history.

(56) References Cited

U.S. PATENT DOCUMENTS 3,649,464 A * 3/1972 Freeman ................ C12M 23/12
220/507
3,785,773 A * 1/1974 Rohrbaugh ........... B01L 3/5085
422/561
(Continued)

FOREIGN PATENT DOCUMENTS

| WO | 2013/068760 A2 | 5/2013 |
| WO | 2017/103522 A1 | 6/2017 |
| WO | 2018/091494 A1 | 5/2018 |

OTHER PUBLICATIONS

Feb. 8, 2023—(EP) Examination Report—App 20721683.9.
Jun. 5, 2020—(WO) International Search Report & Written Opinion—App. No. PCT/GB2020/050938.

*Primary Examiner* — Brian R Gordon
(74) *Attorney, Agent, or Firm* — Banner & Witcoff, Ltd.

(57) ABSTRACT

An assay cartridge for use in a molecular diagnostics assay having an assay region; a first end comprising a first engagement member for engaging with a support housing; and a second end comprising a second engagement member for engaging with a support housing. The second engagement member has a clip, the clip being formed by a resilient element extending from the second end of the cartridge and a fastening element extending from said resilient element. The clip has a release element extending from the resilient element actuatable to release the clip from a caddy in use.

11 Claims, 11 Drawing Sheets

(52) U.S. Cl.
CPC ....... *B01L 2200/04* (2013.01); *B01L 2200/12* (2013.01); *B01L 2200/16* (2013.01); *B01L 2300/043* (2013.01); *B01L 2300/0829* (2013.01)

(56) References Cited

U.S. PATENT DOCUMENTS

| | | | | |
|---|---|---|---|---|
| 4,761,378 | A * | 8/1988 | Godsey | C12M 23/04 422/561 |
| 5,096,672 | A * | 3/1992 | Tervamaki | B01L 3/50855 422/942 |
| 5,308,584 | A * | 5/1994 | Vauramo | B01L 3/5085 422/942 |
| 5,514,343 | A * | 5/1996 | Verwohlt | B01L 3/5085 422/561 |
| 6,096,562 | A * | 8/2000 | Bunn | B01L 3/50855 436/527 |
| D445,907 | S * | 7/2001 | Monks | D24/224 |
| 6,827,907 | B2 * | 12/2004 | Fattinger | B01J 19/0046 211/74 |
| 9,248,449 | B2 * | 2/2016 | Knight | B01L 3/502 |
| 10,472,598 | B2 * | 11/2019 | Tsukada | C12M 23/20 |
| 11,786,903 | B2 * | 10/2023 | Laugharn, Jr. | B01L 3/50855 422/550 |
| 2007/0272689 | A1 * | 11/2007 | Mitsuhashi | B65D 43/267 220/200 |
| 2009/0074624 | A1 | 3/2009 | Liang | |
| 2013/0132006 | A1 * | 5/2013 | Gwynn | B01L 3/021 702/55 |
| 2014/0271360 | A1 | 9/2014 | Buse et al. | |
| 2015/0132841 | A1 * | 5/2015 | Sampson | B01L 9/06 422/561 |
| 2015/0376562 | A1 * | 12/2015 | Baum | B01L 3/50855 435/304.1 |
| 2016/0146203 | A1 | 5/2016 | Yuan | |
| 2017/0043337 | A1 * | 2/2017 | Wang | G01N 35/04 |
| 2017/0136456 | A1 * | 5/2017 | Chen | B01F 31/441 |
| 2017/0225170 | A1 | 8/2017 | Wu et al. | |
| 2017/0327880 | A1 | 11/2017 | Jones | |
| 2019/0151854 | A1 * | 5/2019 | Baum | B01L 3/50851 |
| 2021/0299672 | A1 * | 9/2021 | Lohan | B01L 9/06 |
| 2022/0017890 | A1 * | 1/2022 | Lee | C12M 47/06 |
| 2022/0288596 | A1 * | 9/2022 | Grayson | B01L 9/523 |
| 2023/0085565 | A1 * | 3/2023 | Baum | B01L 3/50855 422/552 |

* cited by examiner

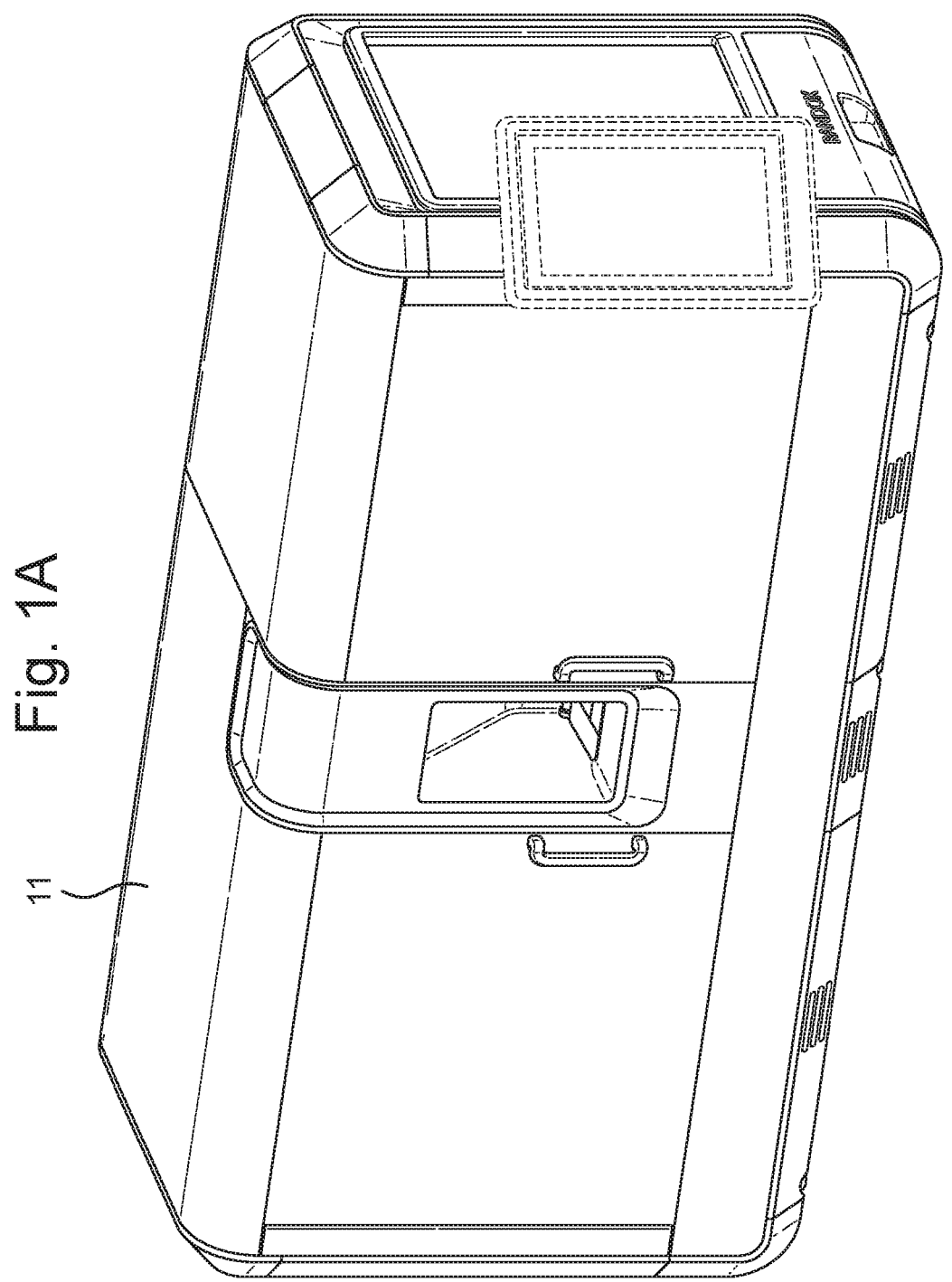

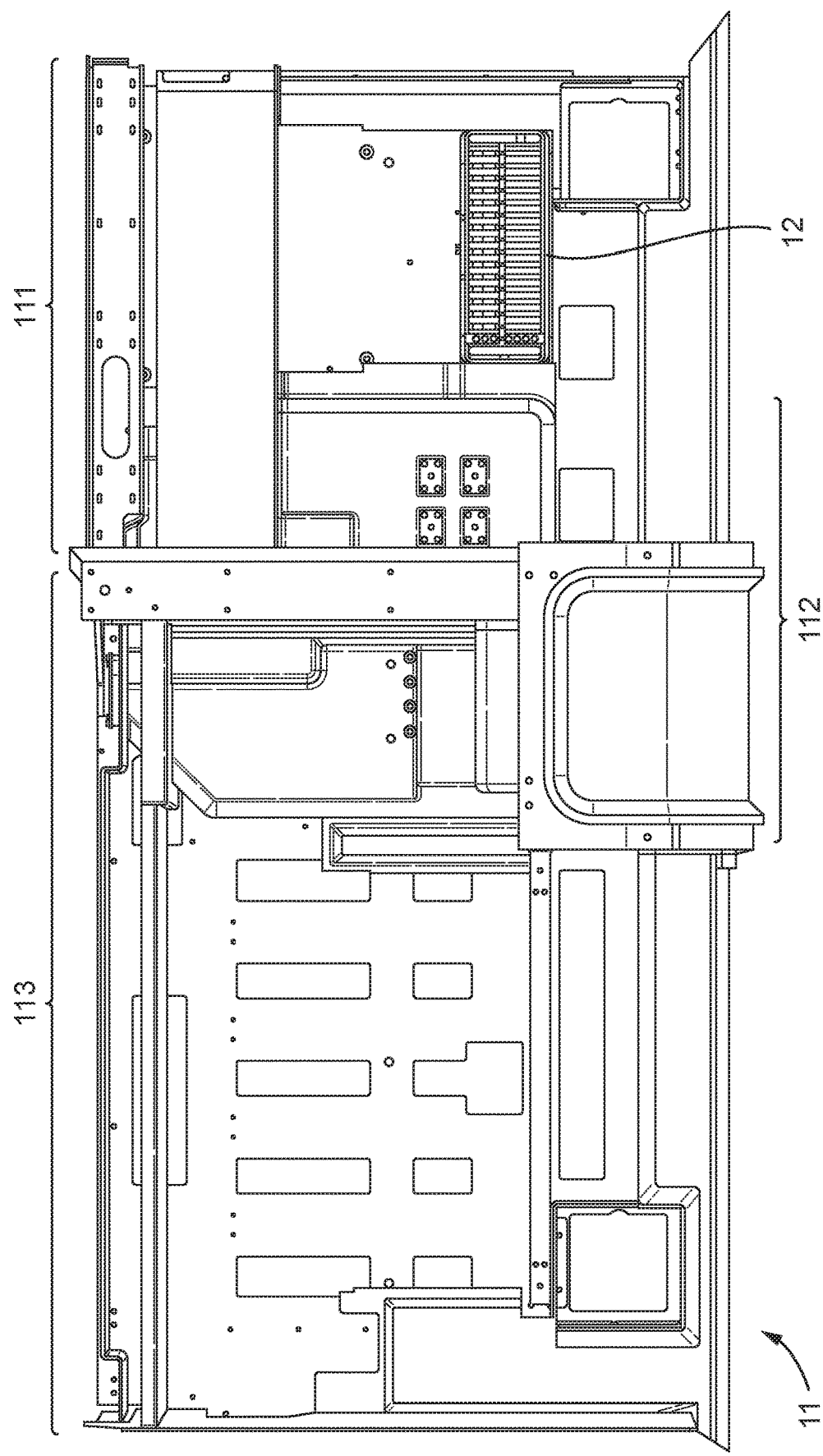

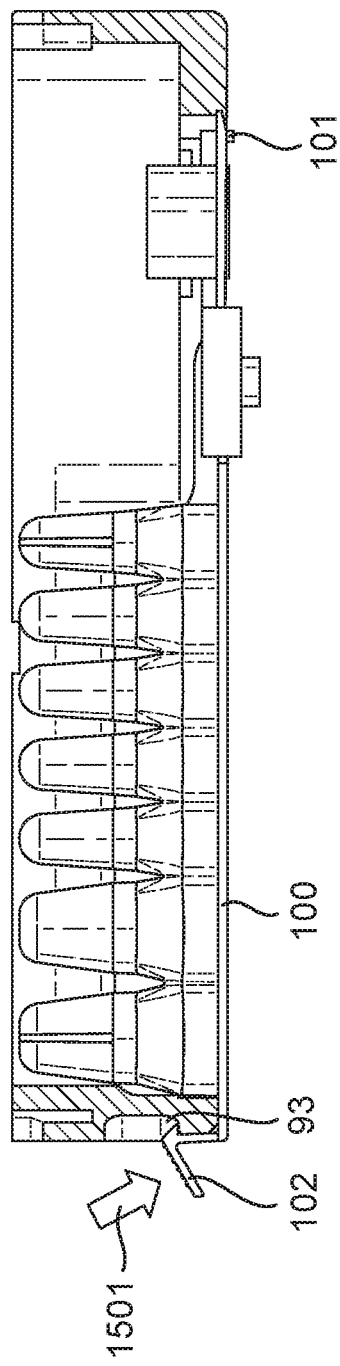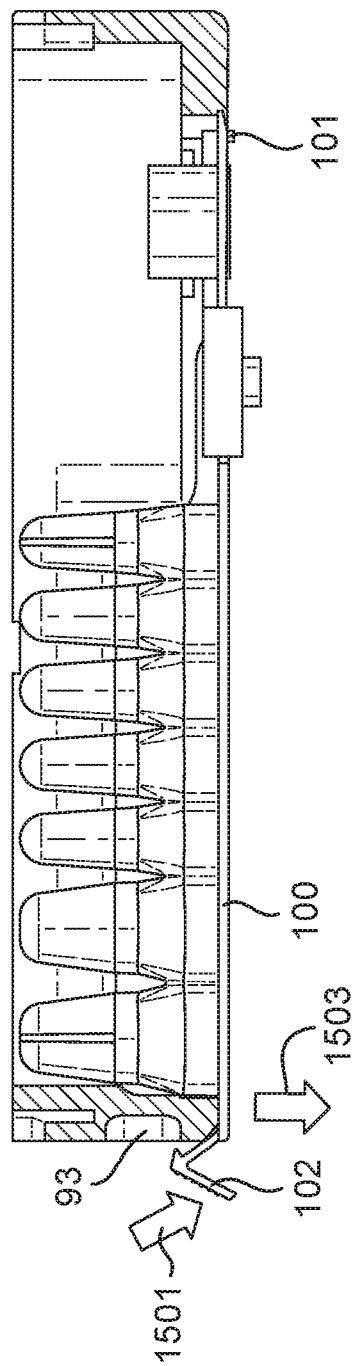

ASSAY CARTRIDGE AND SUPPORT HOUSING

CROSS-REFERENCE TO RELATED APPLICATIONS

This application is a U.S. National Stage application under 35 U.S.C. § 371 of International Application PCT/GB2020/050938 (published as WO 2020/208370 A1), filed Apr. 9, 2020, which claims the benefit of priority to United Kingdom Patent Application No. 1905229.9, filed Apr. 12, 2019. Benefit of the filing date of each of these prior applications is hereby claimed. Each of these prior applications is hereby incorporated by reference in its entirety.

The present invention relates to an assay cartridge and a support housing for holding said assay cartridge.

BACKGROUND TO INVENTION

Identifying the content of a sample is important to many industries and allows analysis of items such as food, chemicals, pharmaceuticals, human and animal body fluids, and drugs. This analysis can take the form of quality control, safety testing, diagnostics, and toxicology, as well as a number of other applications.

Regardless of what type of sample is to be analysed and the intended application, the same general process may be carried out to reach the end result of identifying various constituents of a sample. This process involves purifying the sample, accumulating sufficient quantities of the purified sample to allow for testing, and carrying out a detection process. Such a process is typically called an "assay".

Molecular diagnostics is an example of a process that uses an assay. Molecular diagnostics is used to diagnose and monitor disease as well as to assist in the identification of particular therapies to provide to a patient, for example based on the risk each therapy would pose and how effective each therapy is expected to be. The process involves the analysis of biological markers (also referred to as biomarkers) in the DNA and RNA of a sample.

In order to analyse the biological markers of a sample, the process typically involves extracting and purifying DNA and RNA from the sample. To this end, a lysis process is normally carried out to break down the cell membranes in the sample. This allows for further steps to be taken that can be carried out to isolate and purify the DNA and/or RNA material as required.

One of the subsequent steps is a polymerase chain reaction (PCR) process, which amplifies the extracted DNA and/or RNA. This ensures there is sufficient genetic material to allow reliable detection to be carried out.

After the PCR process is carried out, a detection identifies the various constituents of the amplified sample. One way to achieve this is by the use of biochips. Various chemicals, such as antibodies, are immobilised on the biochip and biochemical reactions occur when the amplified sample is provided.

Biochips may be provided in an array of biochip wells for assay processing. These arrays are free standing, but pose the problem that the loading and unloading of samples is slow. Another problem is that the array must be correctly positioned in the machine by the user, which contributes to the reduced speed of loading the samples. These problems are amplified when the machine used for the assay processing is intended to be used when processing several such arrays.

There is also the problem that the samples and reagents must themselves be provided to the assay machine. At present this is an inconvenient process that can be prone to contamination.

What is needed is a way to provide biochips, reagents, and samples to a machine for assay processing that is more convenient and efficient, and which is less prone to contamination of samples.

SUMMARY OF INVENTION

In accordance with a first aspect of the invention, an assay cartridge for use in a molecular diagnostics assay is provided. The assay cartridge comprises: an assay region; a first end comprising a first engagement member for engaging with a support housing; and a second end comprising a second engagement member for engaging with a support housing. The second engagement member comprises a clip, the clip being formed by a resilient element extending from the second end of the cartridge and a fastening element extending from said resilient element, and the clip comprises a release element extending from the resilient element actuatable to release the clip from a support housing in use.

The cartridge provided according to the first aspect of the invention can be conveniently held in a support housing, such as a caddy, by the first and second engagement members. The use of the first and second engagement members improves the ease with which the cartridge can be loaded into and removed from the support housing. That housing may be fixed in an assay machine, or may alternatively be independent from the assay machine.

The assay region of the cartridge can be customised depending on the intended use of the cartridge, meaning that the cartridge can be used to provide biochips, reagents, and/or samples to a machine for assay processing. The assay region can be modified to reduce the risk of contamination, for example by providing a film over the assay region that is pierced by an aspirator.

As noted above, the assay cartridge can be used with free-standing support housings, i.e. support housings that are independent of the assay machine. The use of a free-standing support housing allows for improvements in the loading and unloading of cartridges into a machine used for carrying out a molecular diagnostics assay, and in particular simplifies the handling of multiple cartridges.

When multiple cartridges are to be used in the assay, these are provided in accordance with the first aspect and are loaded into the same support housing by engaging the first and second engagement members of the respective cartridges with cooperating members in the support housing. The cartridges can then be handled together, which makes it easier to load and unload the cartridges.

By loading multiple cartridges into the same support housing, it is also possible to ensure the cartridges are properly positioned in the machine. The position of each cartridge in the support housing is determined by the positions of the cooperating members that engage with the engagement members of each cartridge, and it is therefore possible to precisely define the positional relationships between the cartridges. Correct positioning of the cartridges can therefore be achieved simply by correctly positioning the support housing in the machine.

Once the support housing has been removed from the machine, the design of the cartridge according to the first aspect allows said cartridge to be easily removed from the support housing. The user disengages the second engagement member from the support housing while the cartridge and support housing are oriented with the cartridge below the support housing.

The assay cartridge according to the first aspect of the invention therefore allows for further advantages when it is desired to perform an assay process using multiple different combinations of samples and reagents.

Preferably, the first engagement member is configured to engage with a support housing to constrain lateral and vertical motion of the first end of the cartridge, while the second engagement member is configured to engage with a support housing to constrain vertical motion of said second end. Thus, when the first and second engagement members are engaged with a support housing motion of the cartridge about its first end, relative to the support housing, is prevented. In particular, rotational motion of the cartridge about its first end is prevented.

The clip provided in embodiments of the first aspect allows for easy engagement with a corresponding element of the support housing. Since the two engagement members constrain the movement of the cartridge once engaged, it is advantageous for one of these two members to be resiliently deformable to some extent. This means that the first engagement member may be engaged first, followed by the second engagement member, so as to improve the ease with which the two engagement members may be engaged. By forming the clip from two separate elements, the resilient element may deform in order to allow the fastening element to engage with a corresponding element of the support housing.

The release element provides a convenient means of easily disengaging the clip from the corresponding element of the support housing. Other means of disengaging the clip could also be provided. For example, the cartridge itself could be resiliently deformable.

According to some embodiments of the first aspect, the first engagement member comprises a lip, the lip being formed by a protrusion at the first end of the cartridge.

The lip of the cartridge according to these embodiments of the first aspect is simple to manufacture and is configured to engage with a recess of the support housing. An alternative solution would be to provide a recess at the first end of the cartridge for engagement with a corresponding element of the support housing.

In order to allow for different uses of the cartridges provided according to the first aspect of the invention, the assay region of the cartridge could be provided in different manners.

In some embodiments, the assay region comprises one or more biochip regions. This allows for a cartridge for use in the detection stage of an assay.

In further embodiments comprising one or more biochip regions, the cartridge may comprise one or more slideable caps that may be positioned over the one or more biochip regions. A cap is useful for preventing evaporation of a sample and/or reagents during incubation of a sample on a biochip. The slideable cap may therefore be used for this purpose whilst also allowing for samples and reagents to be provided on a biochip when positioned away from the corresponding biochip region.

The assay region could also comprises one or more reagent wells. These could be provided in addition to or in absence of the biochip regions of the cartridge. Cartridges provided according to these embodiments allow for a convenient means of providing reagents for an assay.

The reagents are typically used in the detection phase of an assay to enable the desired reactions with a sample. The reagent wells may also contain a wash fluid. This wash fluid may be used to remove samples and/or reagents from a biochip to allow for different combinations of reagents and samples to be provided on the biochip.

The cartridge could also allow for the provision of one or more samples for an assay by providing one or more sample regions in the assay region of the cartridge. These could be provided in addition to or in absence from the biochip regions and/or the reagent wells.

In embodiments comprising one or more sample regions, the cartridge may be modified to ensure that the samples are not contaminated during an assay.

In accordance with a second aspect of the invention, a support housing for holding a biochip cartridge according to the first aspect of the invention is provided. The support housing comprises: a first cooperating member configured to engage with the first engagement member; and a second cooperating member configured to engage with the second engagement member. The support housing comprises a channel for receiving the cartridge of the first aspect, with the first cooperating preferably provided at one end of the channel and the second cooperating member provided at the other end of the channel.

The second aspect of the invention provides a support housing that is configured to hold the cartridge of the first aspect. The two cooperating members are configured to engage with respective engagement members of the cartridge and thereby constrain movement of the cartridge.

The cartridge of the first aspect comprises an assay region that could comprise one or more of biochip regions, reagent wells, and/or sample regions. It is therefore beneficial for the support housing to be able to accept cartridges of different types. A support housing provided according embodiments of the second aspect allows for this by providing a channel. The channel ensures there is sufficient space for the assay region of different cartridges provided according to different embodiments of the first aspect.

In some embodiments of the second aspect, the first cooperating member comprises a first recess for receiving the first engagement member of the cartridge provided according to the first aspect.

As will be understood by the skilled person, there are numerous options when providing corresponding means of engagement on the cartridge and the support housing. For example, a recess could be provided on the cartridge for receiving a protrusion in the support housing. However, providing a recess in the support housing for receiving the first engagement member of the cartridge allows for simpler construction of both the support housing and the cartridge.

Providing a recess in the support housing as the first cooperating member is particularly advantageous when the first engagement member of the cartridge is a lip. The engagement of the two can be easily achieved by providing the first end of the cartridge in the recess such that the lip holds that end of the cartridge.

The second cooperating member of the support housing provided according to the second aspect of the invention may comprise an abutment element and a second recess. This is particularly advantageous when the second engagement member of the cartridge is a clip. In that case, the resilient element of the cartridge abuts with the abutment element of the support housing and the fastening element of the cartridge is received in the second recess. This combination of features of the cartridge and of the support housing allows for the cartridge to be easily secured in the support housing whilst ensuring that the cartridge is correctly positioned.

The support housing may, in some embodiments of the second aspect, comprise handles. The handles allow for a convenient means of carrying the support housing and may also comprise further features that aid in correctly locating the support housing in an assay machine. For example, each handle could comprise a recess for receiving a locating member of an assay machine.

When provided in a support housing, the cartridge is supported by the engagement of the two engagement members with their corresponding cooperating members. The cartridge will typically be made of a material of sufficient resilience that the cartridge sits in the support housing with a flat upper surface when it is supported at its two ends alone, but additional support may be provided by protruding rails provided on each side of the channel and extending at least partially along their respective sides of the channel. The rail supports at least part of the cartridge from below, which ensures that the upper surface of the cartridge is flat.

The rails also allow for an improved design of the first engagement member of the cartridge and of the corresponding first cooperating member of the support housing. It is preferable that the engagement of the first engagement member with the first cooperating member be sufficiently strong that the cartridge be held in place when the second engagement member is also engaged with its corresponding second cooperating member, but sufficiently weak that when the second disengagement member is disengaged the cartridge can be easily removed from the support housing, for example by upturning the support housing. By supporting the first end of the cartridge from below with rails it is possible to reduce the strength of the engagement of the first engagement member with the first cooperating member needed to hold the cartridge flat, which in turn means that the cartridge can be more easily removed from the support housing.

In use, the support housing must be correctly located in an assay machine in order that the machine can locate the different regions of the cartridge. In order to aid the user, the support housing may comprise a notch on its lower side configured to align with a corresponding protrusion in an assay machine. The user seeking to correctly position the support housing need only align the notch with its corresponding protrusion, so the loading of the support housing into an assay machine is made more simple.

In accordance with a third aspect of the invention, there is provided a cartridge-support housing system comprising a cartridge according to the first aspect of the invention provided in a support housing according to the second aspect of the invention.

The cartridge-support housing system of the third aspect provides an improved alternative to the standalone cartridge known in the art. The cartridge is easy to load and unload from the support housing and the combination of the two is easier to load into an assay machine than the prior art standalone cartridge.

In accordance with a fourth aspect of the invention, a method of loading a cartridge according to the first aspect of the invention into a support housing according to the second aspect of the invention is provided. The method comprises the steps of: engaging the first engagement member with the first cooperating member; and engaging the second engagement member with the second cooperating member.

In accordance with a fifth aspect of the invention, a method of unloading a cartridge according to the first aspect of the invention from a support housing according to the second aspect of the invention is provided. The method comprises the steps of: orienting the cartridge and support housing such that the cartridge is below the support housing; and disengaging the second engagement member from the second cooperating member, the weight of the cartridge thereby causing disengagement of the first engagement member from the first cooperating member.

The fourth aspect of the invention provides a method of loading a cartridge into a corresponding support housing, while the fifth aspect provides a method of unloading the cartridge. By providing a method of loading the cartridge in which the engagement of the first engagement member is independent from the engagement of the second engagement member, the disengagement of these engagement members may also be independent. It is therefore possible to achieve the benefits of the quick release of the cartridge provided by the fifth aspect, in which the user need only turn the support housing upside down and release the second engagement member in order to cause disengagement of the first engagement member.

BRIEF DESCRIPTION OF THE DRAWINGS

Embodiments of the invention are described herein with reference to the accompanying drawings, of which:

FIG. 1A shows an isometric view of a machine that may be used in a molecular diagnostics assay;

FIG. 1B shows plan view of the machine of FIG. 1A but with its upper cover removed;

FIGS. 15A and 15B show the removal of a cartridge from a cartridge support housing system according to embodiments of the invention.

DETAILED DESCRIPTION OF THE DRAWINGS

Figure 2:
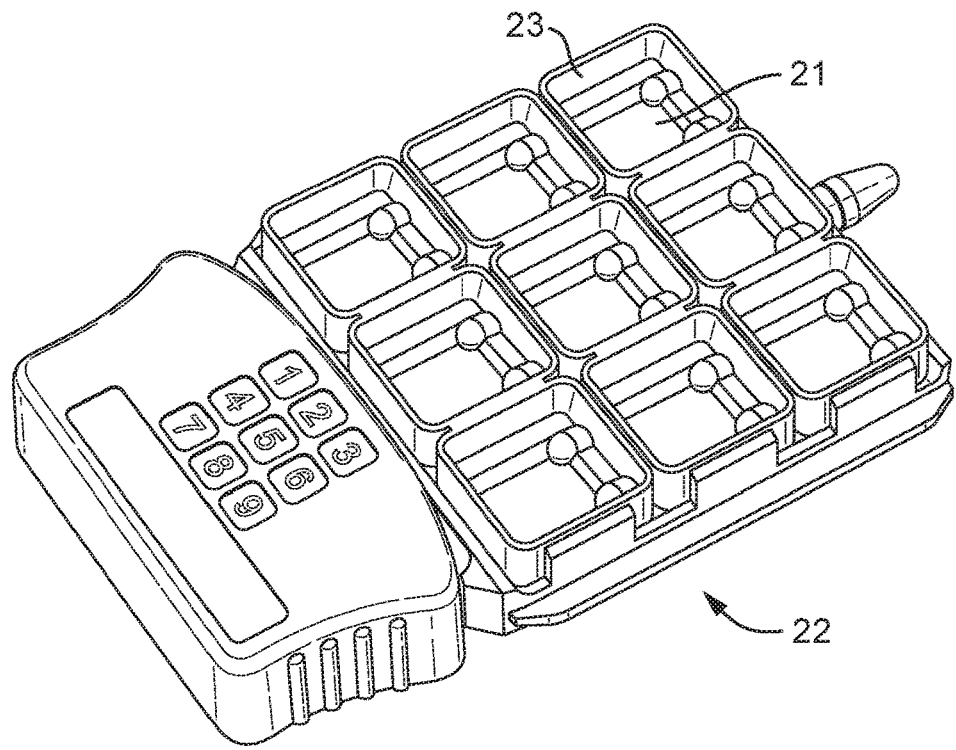
FIG. 2 shows a prior art array of biochips for use in molecular diagnostics assays.

FIG. 1A shows an example of a machine 11 that may be used in a molecular diagnostics assay. The machine 11 may be configured to carry out one or more of the steps of an assay, including extraction of DNA/RNA from a sample, amplification of the sample, and/or analysis of the amplified sample. Typically, the extraction is carried out by a lysis process, the amplification of the sample by a polymerase chain reaction (PCR) process, and the analysis of the sample by detecting biochemical reactions occurring on a biochip.

FIG. 1B shows a plan view of the interior of the assay machine 11. This particular example shows an analyser 11 that is separated into different sections 111, 112, and 113 where each of the extraction and purification (section 111), amplification (section 112), and detection (section 113) steps is carried out. A cartridge-caddy system 12 as described herein is shown in section 111 of the analyser.

The biochip 21 may itself be provided as part of an array of biochips 22, and FIG. 2 shows an example of a prior art array 22 that comprises several biochips 21 in separate biochip wells 23. In conventional assay machines suitable for use with the biochip 21, reagents are typically stored in large bottles inside the assay machine. In order to supply a reagent to the biochip 21, a robotic pipettor travels to the relevant bottle, collects a volume of the reagent and then travels to the biochip onto which it dispenses the reagent. The use of an array 22 of biochips 21 simplifies the assay process, but there are nevertheless problems associated with the use of these arrays 22.

Firstly, in order to provide reagents and samples onto the biochips 21 it is necessary for the machine to be able to determine the location of these biochip wells 23. This is especially important when different samples and/or reagents are to be provided in separate regions of a single biochip 21, as this requires precise spotting of samples and reagents. These prior art arrays 22 must therefore be provided on mechanical assemblies that allow for accurate positioning of the biochips. These mechanical assemblies have introduced additional complexity into the machines used for carrying out assays.

The second problem associated with the arrays 22 used up until now is that these arrays 22 are difficult to load into a machine for assay processing, a problem that is particularly acute when several such arrays 22 must be loaded for processing at once. Similarly, the unloading of arrays 22 is less simple than might be desired. The processing of samples is therefore slowed down by the reduced speed of loading and unloading.

Thirdly, reagents stored in large bottles for long periods of time are susceptible to loss by evaporation and instability due factors such as variations in the ambient conditions (e.g. temperature and humidity). While it is possible to incorporate additional apparatus to control these factors, doing so adds complexity to the assay machine. It is often not practical to achieve the desired degree of control without impinging severely on other considerations (e.g. the size of the machine, maintenance requirements, and ease of operation).

Therefore, what is needed is a means of providing biochips, reagents, and samples to a machine for assay processing that is more convenient and efficient, and which is less prone to contamination of samples.

Figure 3:
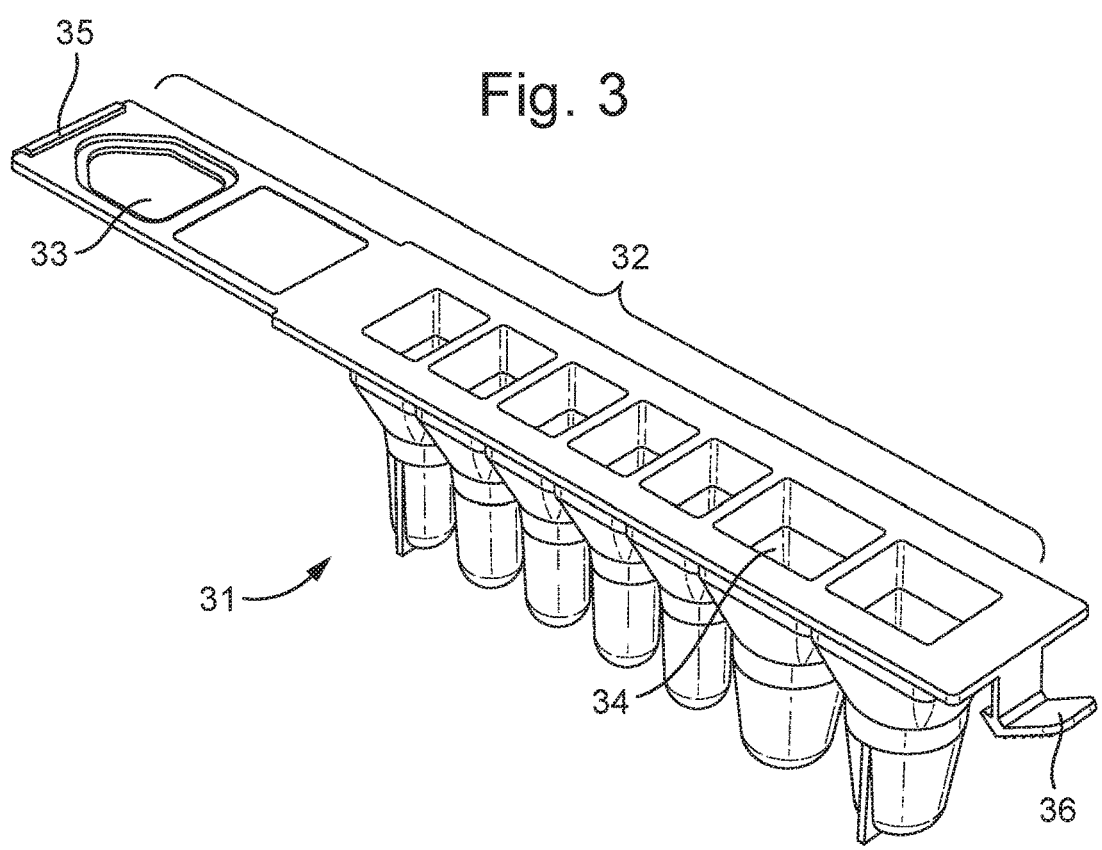
FIG. 3 shows an isometric view of a cartridge according to embodiments of the invention.

FIG. 3 shows a cartridge 31 according to an embodiment of the invention that solves these and other problems. This particular example of the invention provides an elongate cartridge 31 that comprises, in an assay region 32 of the cartridge 31, a biochip region 33 and a plurality of reagent wells 34. The specifics of the biochip do not affect the functioning of the cartridge 31, which can be adapted to be used with different types of biochip. At one end of the cartridge there is provided a protrusion 35, or lip, as a first engagement member that allows for engagement with a corresponding portion of a support housing. The support housing will be described later. At the other end of the cartridge there is provided a clip 36 as a second engagement member for engaging with a different portion of the support housing.

The protrusion 35 that forms the lip 35 of the cartridge 31 extends outwardly from the upper surface of the cartridge 31. The protrusion 35 extends by an extent that provides a balance between ensuring sufficient engagement with the support housing to hold the cartridge 31 in place while allowing the cartridge 31 to be easily removed. In particular, the quick release of the cartridge 31 that is described later benefits from a lip 35 that does not stick when the support housing is upturned and the clip 36 is disengaged. The protrusion 35 preferably extends by a distance from 1 mm to 3 mm from the upper surface of cartridge 31, and more preferably extends by 2 mm from the upper surface of the cartridge 31.

Figure 4:
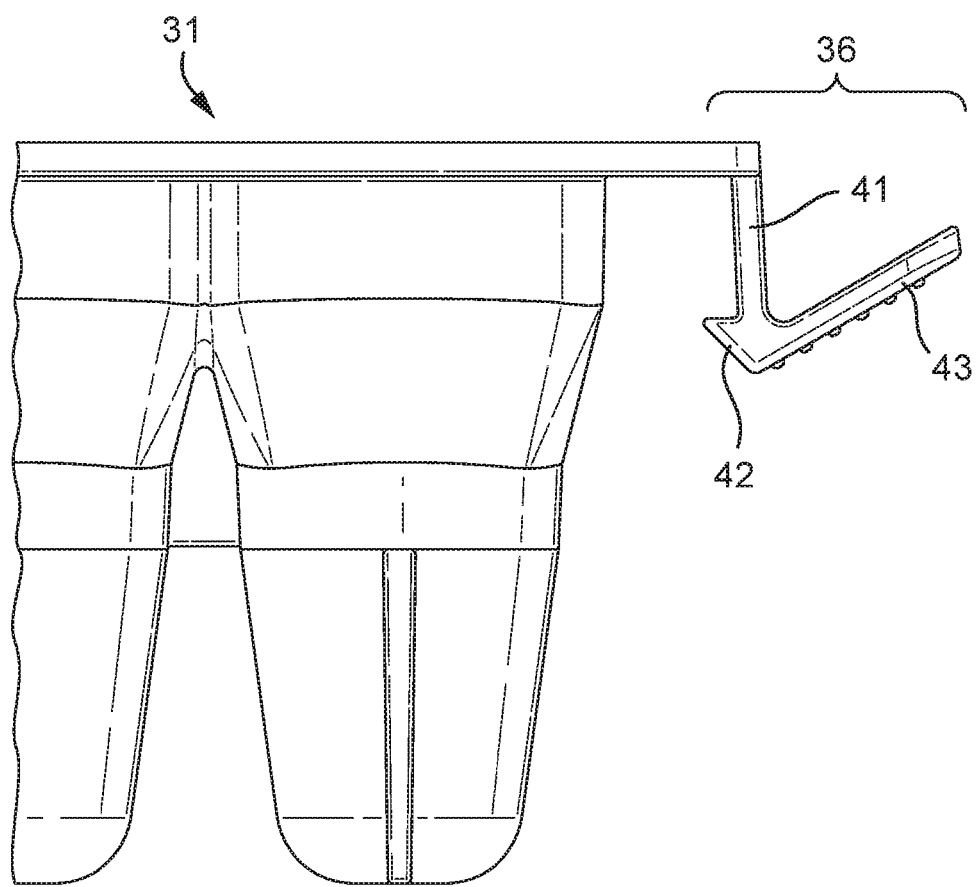
FIG. 4 shows a close up view of the clip of the cartridge provided according to embodiments of the invention.

The clip 36 at the other end of the cartridge 31 is shown in more detail in FIG. 4. The clip 36 comprises a resilient element 41 that is configured to abut with a support housing and a pawl 42 as a fastening element that extends from the resilient element 41. The pawl 42 serves to constrain the vertical movement of the cartridge 31, such that when the lip 35 and the clip 36 are both engaged the cartridge 31 is held within the support housing. The clip 36 also comprises a release element 43. The release element 43 extends from the resilient element 41 in a direction opposite to the pawl 42, such that when a user presses on the release element 43 the clip 36 is disengaged. By pressing on the release element 43, a moment is created about the point where the resilient element 41 is attached to the cartridge and the clip 36 rotates about this point. The pawl 42 exits the recess and the clip 36 is disengaged. When looking from the direction shown in FIG. 4, the rotation is in an anticlockwise sense.

The assay region 32 of the cartridge 31 can be modified depending on the intended use of the cartridge 31. The biochip region 33 can be removed and replaced with further reagent wells 34, or conversely the cartridge 31 could comprise more than one biochip region 33, possibly absent any reagent wells 34. Alternatively, the cartridge 31 could comprise one or more sample regions so that the cartridge 31 could be used to provide samples for testing. The cartridge 31 could also comprise any combination of biochip regions 33, reagent wells 34, and sample regions. The individual reagent wells 34 may differ in volume from one another. In this example, the two reagent wells 34 nearest the clip 36 are of a greater volume than the others (as is clearly visible in FIG. 3). In general, the number, volumes and arrangement of the reagent wells 34 can be chosen to suit the particular assay for which the cartridge 31 is intended for use in.

The cartridge 31 may also comprise a slide cap. This is not shown in FIG. 3 but may be seen in the cartridges illustrated in FIGS. 9 to 12. The cap finds utility in some embodiments of the invention in which the cartridge 31 comprises one or more biochip regions 33. The assay may require incubation of the biochip, in which case the slide cap can be positioned over the biochip during incubation to prevent evaporation of the sample or of any reagents.

The cartridge 31 is typically made of medical grade polypropylene, for example H350, which is a particular medical grade polypropylene manufactured by Total S.A. Medical grade polypropylenes are particularly suitable since they typically do not react with biological materials and are easily moulded into the required shapes. The softness of the material used is selected so as to ensure the desired level of rigidity. If the material is too soft the rigidity will be low, in which case the cartridge 31 might bow outwards from a support housing or the clip 36 might not fasten securely to a support housing. Conversely, if the material is too hard the rigidity will be high and it will be difficult to engage and disengage the clip 36.

In some examples to prepare a cartridge 31 for use, a user manually dispenses sample fluid (e.g. liquid), reagents and/or wash into respective wells 34 in a predetermined dispensing plan that identifies which well each substance should be dispensed into. Each well is only able to be filled to a particular volume. This gives the user confidence that by filling the well, they have provided the correct amount of substance into the respective well, and that the environment the sample is exposed to is controlled to the level expected by the user up to the point when testing is carried out. This is in contrast to large bottles (such as those used in conventional analysers), being provided that have the associated detrimental factors outlined above.

Figure 5:
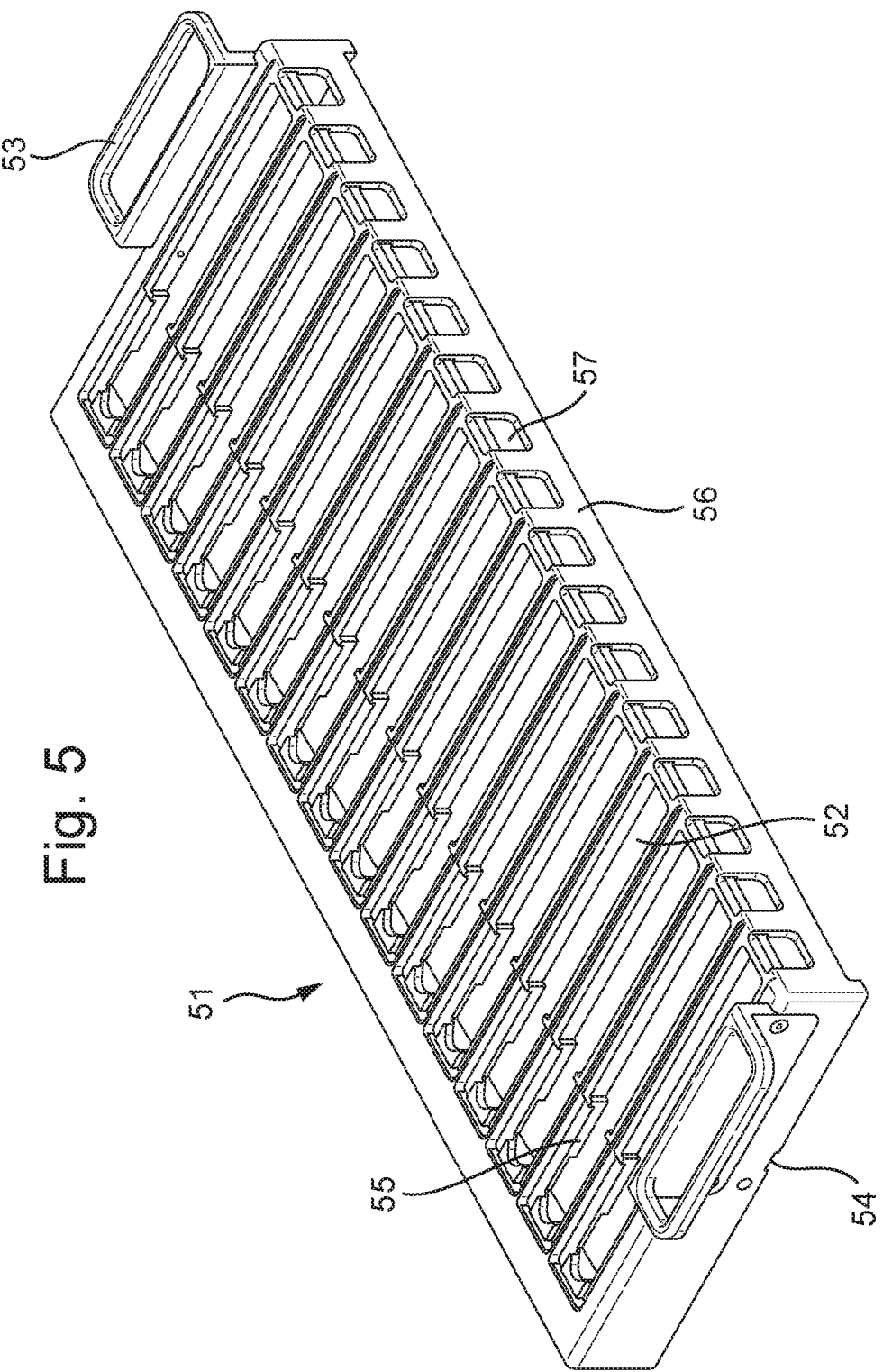
FIG. 5 shows an isometric view of a support housing provided according to embodiments of the invention.
Figure 7:
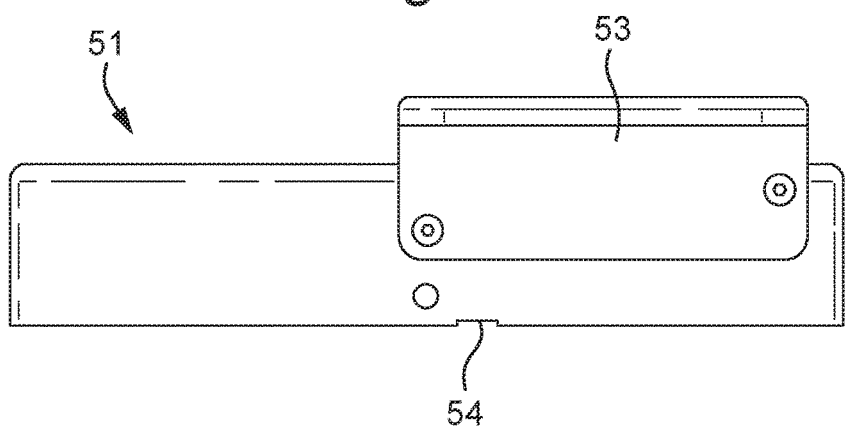
FIG. 7 shows an elevation view of the support housing of FIG. 5.

An example of a support housing 51 configured to hold cartridges according to the invention is shown in isometric view in FIG. 5, in which the support housing 51 takes the form of a caddy 51. The caddy 51 comprises regions 52 for receiving cartridges that are spaced regularly along the caddy 51. The caddy 51 can be configured to receive different numbers of cartridges. At either end of the caddy 51 there is provided a handle 53 for carrying the caddy 51. An assay machine suitable for use with the caddy 51 could be provided with features adapted to cooperate with the handles 53 so as to improve the ease and accuracy with which the caddy 51 can be aligned inside the assay machine. The caddy 51 also comprises a notch 54 in its base to aid in positioning of the caddy 51 in an assay machine. The notch 54 aligns with a corresponding protrusion in the assay machine to ensure that the caddy 51 will be correctly positioned. As the cartridges all have fixed positions within the caddy 51, this in turn means that the assay machine can determine the locations of the biochips, reagent wells, and/or sample regions. The notch can be seen more clearly in FIG. 7. The notch 54 is preferably provided off-centre so that the caddy 51 can only be loaded into the assay machine with one orientation.

Figure 6:
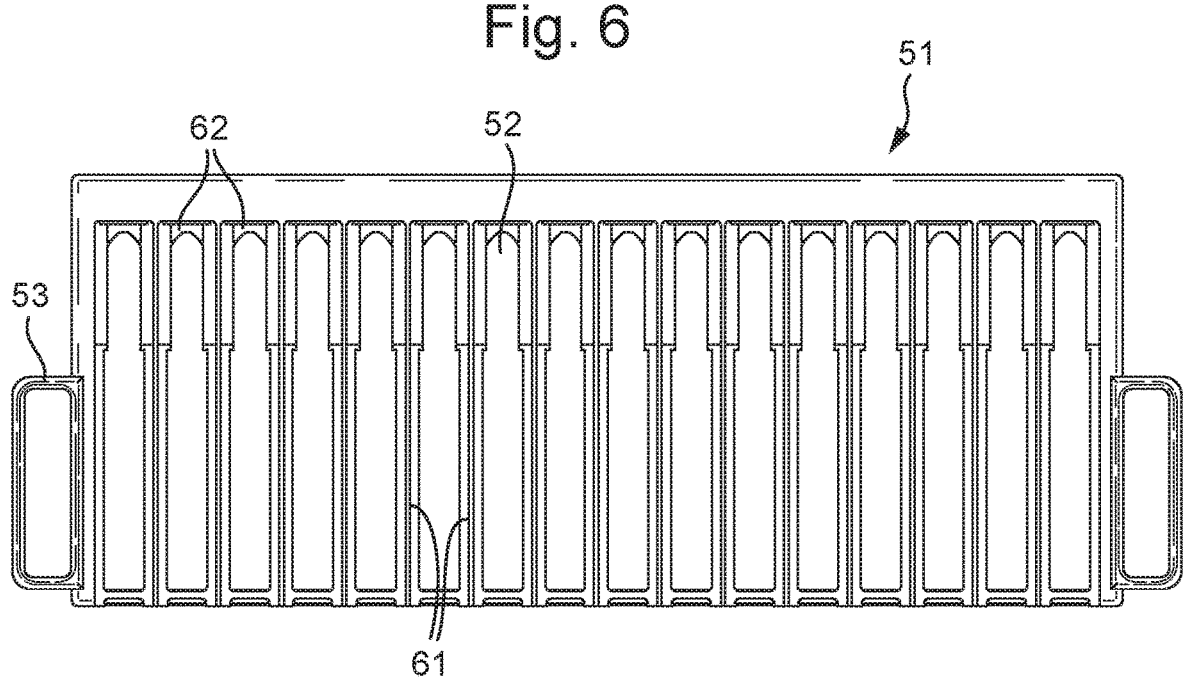
FIG. 6 shows a plan view of the support housing of FIG. 5.
Figure 8:
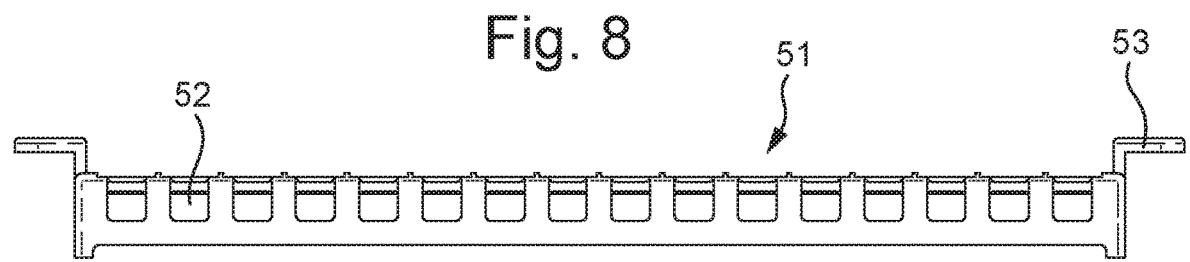
FIG. 8 shows a front-on view of the support housing of FIG. 5.

The regions 52 for receiving the cartridges can be seen more clearly in FIGS. 6 and 8. Each region comprises a channel providing side walls 61 between each cartridge that serve to separate the cartridges. The rearmost section of each channel comprises protruding rails 62, which preferably extend along a third of the length of each channel. These rails 62 provide support to the cartridge so as to ensure the upper surface of each cartridge is flat when held in the caddy 51.

At the rear of each channel there is provided a first recess 55 as a first cooperating member for receiving the end of the cartridge having the lip. The lip engages with the first recess 55 to hold this end of the cartridge in place. At the other end of the channel there is an abutment element 56 for abutting with the first element of the clip, and below the abutment element there is provided a second recess 57 for receiving the second element of the clip. The abutment element 56 and recess 57 together function as a second cooperating member.

The caddy 51 is typically reusable and is accordingly made of a material that is resistant to wear and tear. For example, the caddy 51 may be made of metal, preferably aluminium.

Figure 9:
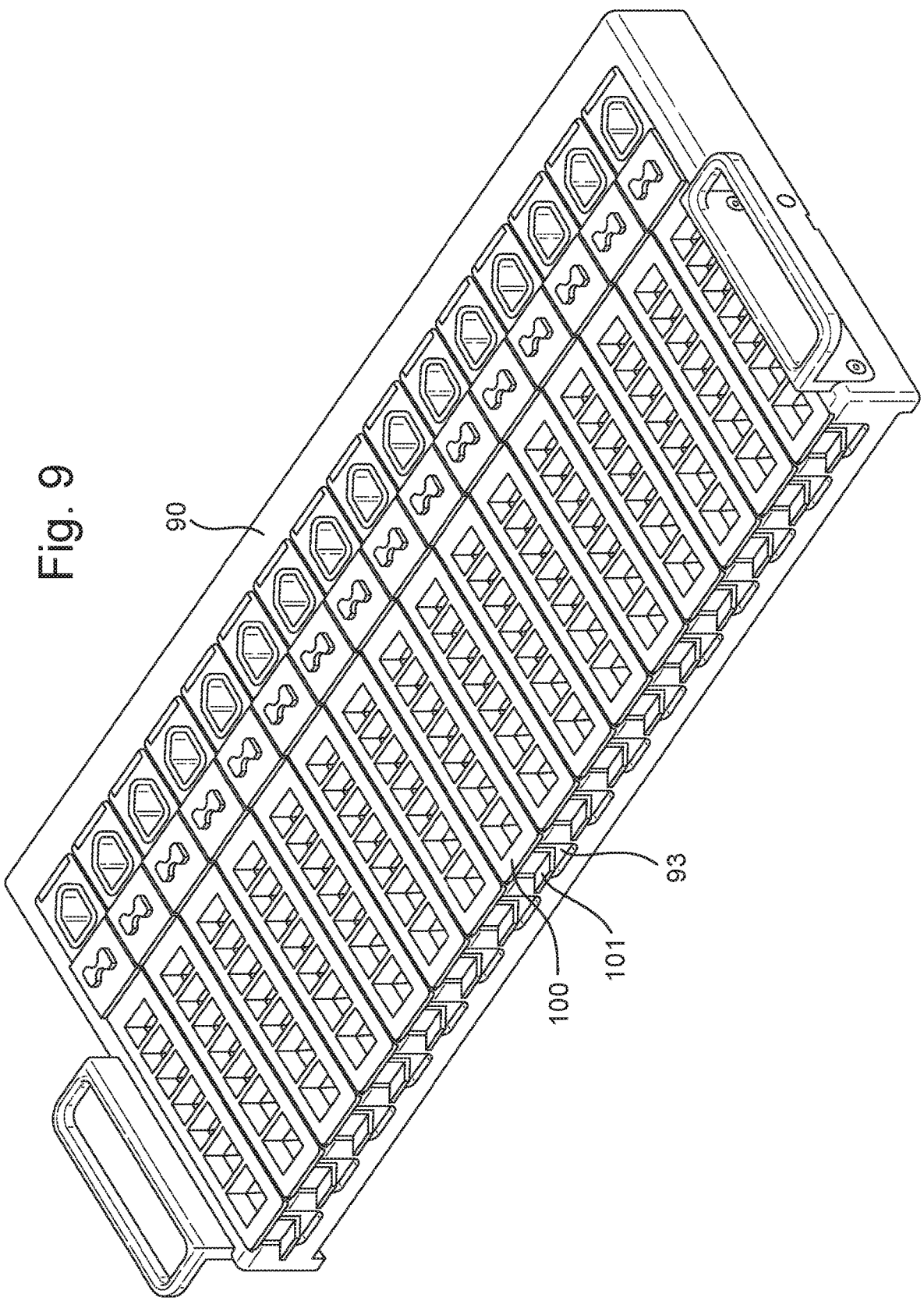
FIG. 9 shows an isometric view of a support housing according to embodiments of the invention in which are provided cartridges according to embodiments of the invention.

FIG. 9 shows an example of a support housing 90, again in the form of a caddy 90, holding cartridges 100. The lip 101 of each cartridge 100 is engaged with the corresponding first recess 91 (shown most clearly in FIGS. 11 and 13) in its respective channel 92 in the caddy 90, and each clip 102 is also engaged with the corresponding second recess 93 and abutment member 94 of the caddy 90. The two ends of each cartridge 100 are held by the lip 101 and the clip 102 such that the movement of the cartridge 100 is inhibited. The rails 95, in combination with the engagement of the clips 102 and the lips 101, provide sufficient support for each cartridge 100 that the upper surface of each cartridge 100 is substantially flat when held in the caddy 90.

Figure 10:
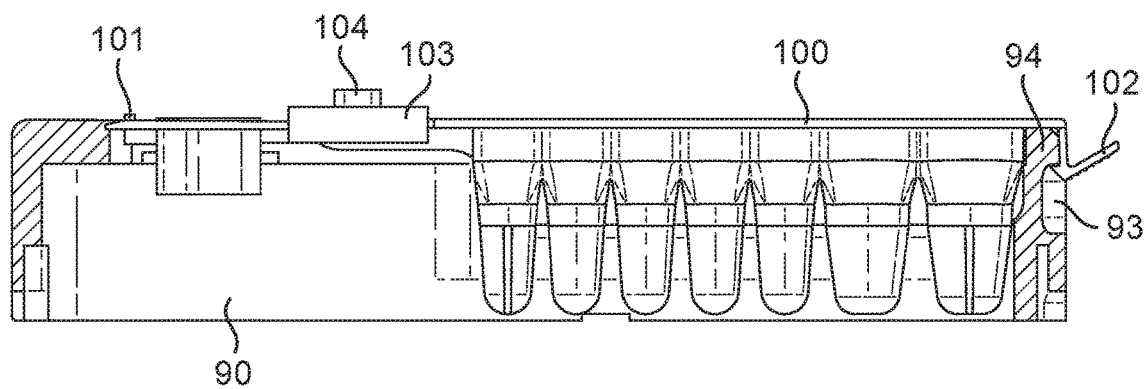
FIG. 10 shows a cross-sectional view of the cartridge-support housing system of FIG. 9.

Viewing a cross section of the cartridge-caddy system of FIG. 9 taken along the length of the caddy 90, as shown in FIG. 10, the engagement of the lip 101 and the clip 102 of the cartridge 100 with the corresponding recesses 91, 93 of the caddy 90 may be seen. The engagement of the lip 101 constrains the horizontal and vertical movement of the cartridge 100, while the clip 102 constrains the vertical movement of the cartridge 100. When both the lip 101 and the clip 102 are engaged, the cartridge 100 is prevented from falling out of the caddy 90.

As noted above, FIGS. 9 and 12 also show a slide cap 103 as part of the cartridge 100. The slide cap 103 is configured such that it does not interfere with the positioning of the cartridge 100 in the channel 92. The position of the slide cap 103 may be changed while the cartridge 100 is held in the caddy 90 so that a sample and/or reagents may be provided on the biochip and the lid repositioned over the biochip region, i.e. closed, to prevent evaporation. As shown in the figures, the slide cap 103 comprises a protrusion 104. The protrusion 104 is shaped to allow enable repositioning of the cap 103 by an element of an assay machine, such that the cap 103 may be closed after reagents and/or samples have been provided by the assay machine on the biochip.

Figure 11:
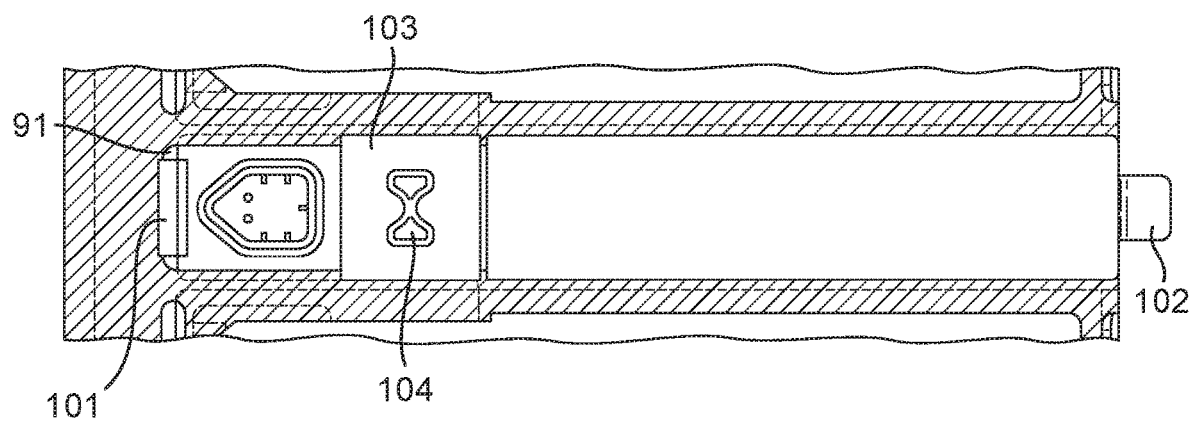
FIG. 11 shows a different cross-sectional view of the cartridge-support housing system of FIG. 9.
Figure 12:
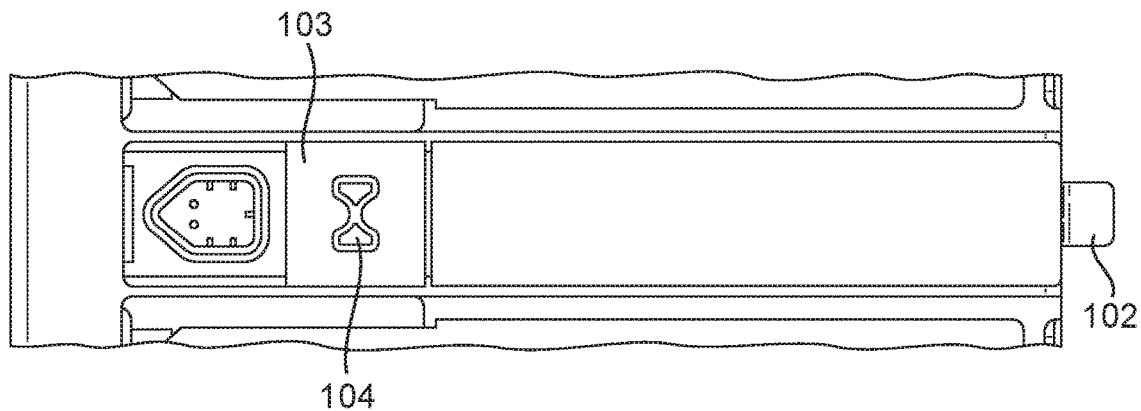
FIG. 12 shows a plan view of the cartridge-support housing system of FIG. 9.
Figure 13:
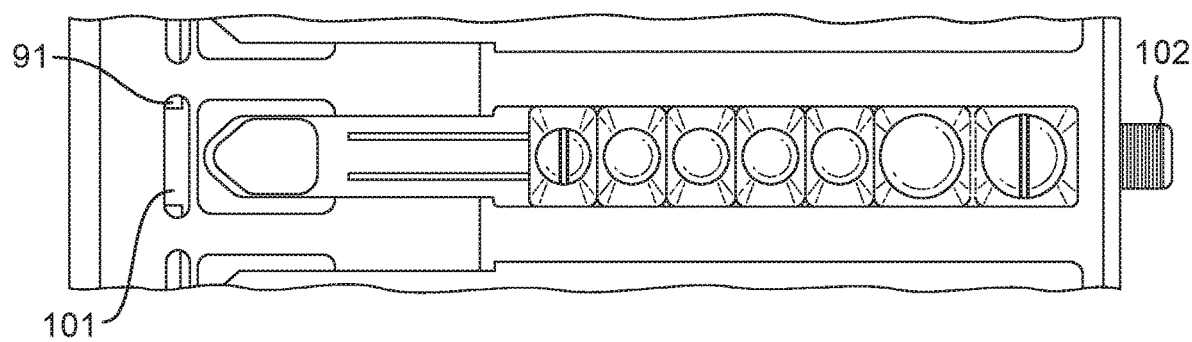
FIG. 13 shows a plan view of the underside of the cartridge-support housing system of FIG. 9.

The engagement of the lip 101 can be seen particularly well in FIGS. 11 to 13. Comparing the cross section of FIG. 11 and the plan view of FIG. 12, it is possible to see that the lip 101 extends beyond the end of the channel 92 and into a recess 91 in the caddy. In this example an elongate hole is formed in the caddy 90 at the position of the recess 91, which allows a user to easily determine by sight whether the lip 101 is correctly positioned in the recess 91 (and accordingly confirm whether the cartridge 100 is correctly mounted in the caddy 90).

Figure 14:
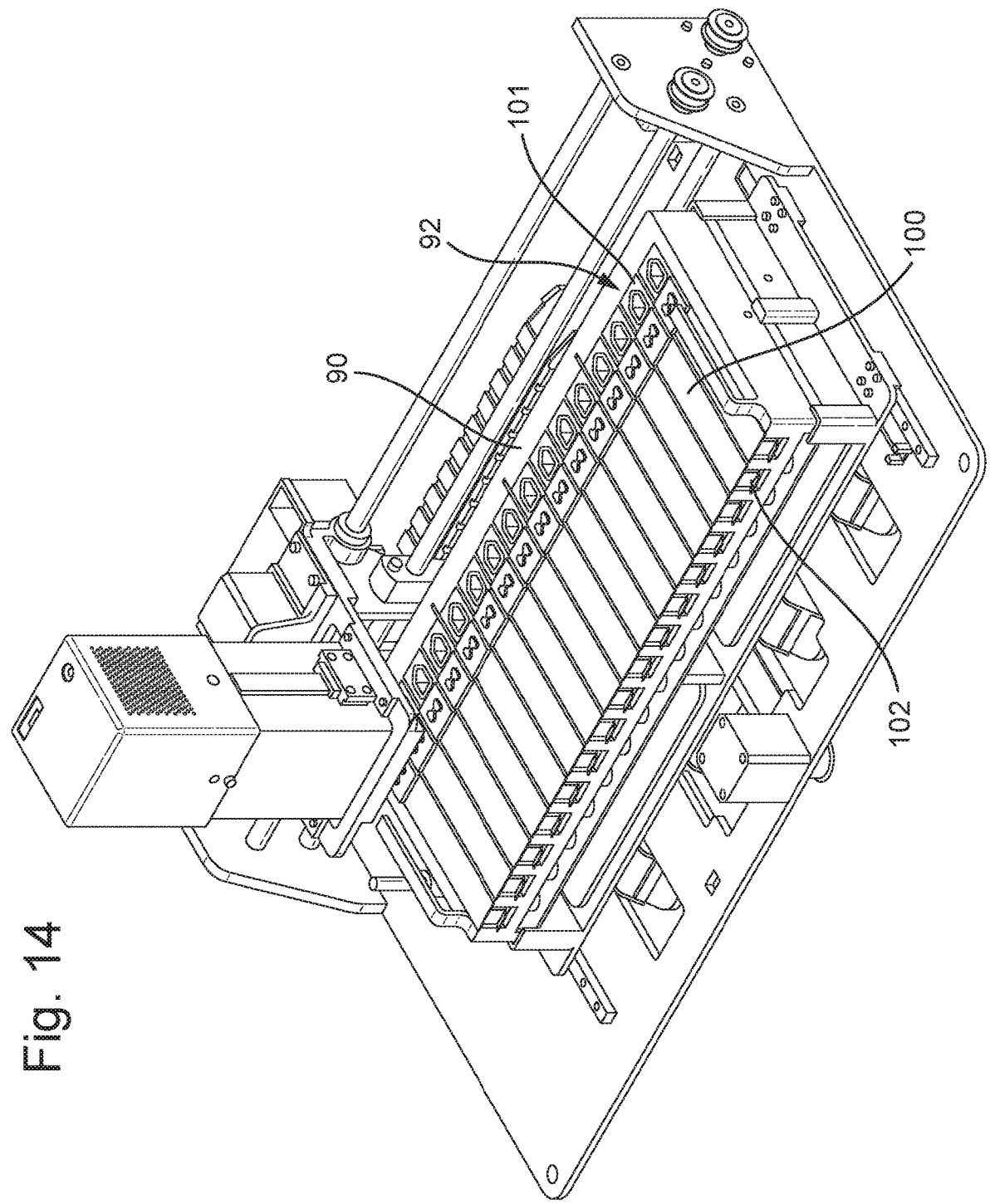
FIG. 14 shows a cartridge-support housing system according to embodiments of the invention in use in an assay machine.

FIG. 14 shows a cartridge-caddy system positioned in an assay machine. Each cartridge 100 is accurately located in its respective channel 92 by means of the clip 102 and the lip 101 and the caddy 90 is itself correctly positioned owing to the alignment of the notch 54 with the corresponding protrusion in the machine. A camera can then be correctly positioned over each biochip to detect reactions, for example bioluminescence or chemiluminescence.

Similarly, an aspirator, not shown, can be correctly positioned over each reagent well, and samples and reagents can be precisely located on different regions of the biochip. The assay machine may also comprise one or more elements for repositioning the slide cap using the protrusion. The aspirator may comprise an element to position the slide cap over the biochip after samples and reagents have been provided, while the camera may comprise an element for moving the slide cap away from the biochip region to allow for detection of reactions.

Once the relevant steps of the assay have been completed, the cartridge-caddy system is removed from the assay machine and the cartridges 100 removed from the caddy as illustrated in FIGS. 15A and 15B. The cartridge-caddy system is inverted so that the cartridges 100 are below the caddy 90 and the user presses the release element of the clip 102 of each cartridge 100 in turn.

FIG. 15A shows the cartridge-caddy system prior to the release element of the clip being pressed. Pressing on the release element along the direction indicated by the arrow 1501 causes disengagement of the clip 102 from the recess 93 in the caddy. As a result, this end of the cartridge 100 falls from the caddy 90. The weight of the cartridge 100 is then supported only by the engagement of the lip 101 with its respective recess 91. The lip 101 and the recess 91 are configured such that the engagement of the lip 101 with its respective recess 91 is not itself sufficient to support the weight of the cartridge 100 when the caddy 90 is inverted, so once the clip 102 of the cartridge 100 is disengaged the weight of the cartridge 100 causes disengagement of the lip 101. Thus, the user can eject the cartridges 100 from the caddy 90 by pressing each release element in turn.

Typically, the process shown in FIG. 15 is carried out with the cartridge-caddy system positioned over a bin so that the spent cartridges 100 may be easily collected.

Once the cartridges 100 have been ejected the caddy 90 can be loaded with new cartridges 100 for use in another assay process.

The invention claimed is:

1. A cartridge-housing system, comprising:
   an assay cartridge for use in a molecular diagnostics assay and a support housing for holding the assay cartridge;
   the assay cartridge comprising:
     a first end of the assay cartridge comprising a first engagement member for engaging with the support housing;
     a second end of the assay cartridge comprising a second engagement member for engaging with the support housing; and
     an assay region connected to the first end of the assay cartridge and the second end of the assay cartridge;
     wherein the second engagement member comprises a clip, the clip being formed by a resilient element extending from the second end of the assay cartridge and a fastening element extending from said resilient element, and
     wherein the clip comprises a release element extending from the resilient element actuatable to release the clip from a support housing in use, and wherein the first engagement member comprises a lip, the lip being formed by a protrusion extending upwardly from an upper surface of the first end of the assay cartridge; and
   the support housing comprising:
     a first cooperating member configured to engage with the first engagement member; and
     a second cooperating member configured to engage with the second engagement member;
     wherein the support housing comprises a channel for receiving the assay cartridge, the channel comprising a first end of the channel and a second end of the channel; and
     wherein the first cooperating member is connected to the first end of the channel and the second cooperating member is connected to the second end of the channel, wherein the first cooperating member comprises a first recess for receiving the lip of the assay cartridge, and wherein the second cooperating member comprises an abutment element for abutting with the resilient element of the clip and a second recess.

2. The cartridge-housing system according to claim 1, wherein the support housing comprises handles each connected to a respective side of the support housing.

3. The cartridge-housing system according to claim 1, wherein the channel of the support housing comprises two sides, and wherein each side of the channel of the support housing comprises a protruding rail, each rail extending at least partially along one of the two respective sides of the channel.

4. The cartridge-housing system according to claim 1, wherein the support housing comprises a lower side, the lower side comprising a notch.

5. The cartridge-housing system according to claim 1, wherein the assay region comprises one or more biochip regions.

6. The cartridge-housing system according to claim 5 wherein the assay cartridge comprises one or more slideable caps connected to the assay cartridge that may be positioned over the one or more biochip regions.

7. The cartridge-housing system according to claim 1, wherein the assay region comprises one or more reagent wells.

8. The cartridge-housing system according to claim 7, wherein at least one of the reagent wells includes a fluid.

9. The cartridge-housing system according to claim 1, wherein the assay region comprises one or more sample regions.

10. A method of loading an assay cartridge into a support housing, the method comprising:
    engaging a first engagement member of the assay cartridge with a first cooperating member of the support housing, wherein the assay cartridge comprises an assay region connected to a first end of the assay cartridge comprising the first engagement member, wherein the first engagement member comprises a lip, the lip being formed by a protrusion extending upwardly from an upper surface of the first end of the assay cartridge, and wherein the support housing comprises a first cooperating member configured to engage with the first engagement member, wherein the first cooperating member comprises a first recess for receiving the lip of the assay cartridge, and a channel for receiving the assay cartridge, the channel comprising a first end of the channel and a second end of the channel, wherein the first cooperating member is connected to the first end of the channel; and
    engaging a second engagement member of the assay cartridge with a second cooperating member of the support housing, wherein the assay region is further connected to a second end of the assay cartridge comprising the second engagement member, wherein the second engagement member comprises a clip being formed by a resilient element extending from the second end of the assay cartridge and a fastening element extending from said resilient element, wherein the clip comprises a release element extending from the resilient element actuatable to release the clip from the support housing in use, and wherein the support housing further comprises the second cooperating member, wherein the second cooperating member comprises an abutment element for abutting with the resilient element of the clip and a second recess, and wherein the second cooperating member is connected to the second end of the channel.

11. The method of claim 10, further comprising unloading the assay cartridge from the support housing by:
    orienting the assay cartridge and support housing such that the assay cartridge is below the support housing; and disengaging the second engagement member from the second cooperating member, the weight of the assay cartridge thereby causing disengagement of the first engagement member from the first cooperating member.

* * * * *